US011974689B2

(12) United States Patent
Smits

(10) Patent No.: US 11,974,689 B2
(45) Date of Patent: May 7, 2024

(54) COOKING APPLIANCE, IN PARTICULAR COMMERCIAL COOKING APPLIANCE

(71) Applicant: WELBILT DEUTSCHLAND GMBH, Eglfing (DE)

(72) Inventor: Stan Smits, Weilheim (DE)

(73) Assignee: WELBILT DEUTSCHLAND GMBH, Eglfing (DE)

( * ) Notice: Subject to any disclaimer, the term of this patent is extended or adjusted under 35 U.S.C. 154(b) by 1 day.

(21) Appl. No.: 17/542,654

(22) Filed: Dec. 6, 2021

(65) Prior Publication Data
US 2022/0175170 A1 Jun. 9, 2022

(30) Foreign Application Priority Data
Dec. 7, 2020 (DE) .......................... 102020132482.0

(51) Int. Cl.
*A47J 27/00* (2006.01)
*A47J 27/04* (2006.01)

(52) U.S. Cl.
CPC ............ *A47J 27/004* (2013.01); *A47J 27/04* (2013.01); *A47J 2027/043* (2013.01)

(58) Field of Classification Search
CPC .... F24C 15/327; F24C 14/005; F24C 15/003; F24C 15/14; F24C 7/08; F24C 7/085; A21B 3/04; A21B 1/40; A21B 3/00; A47J 27/16; A47J 2027/043; A47J 27/04; A47J 27/14; A47J 27/18; A47J 27/21008; A21D 8/06; B08B 2209/08; B08B 9/093; G05B 19/106; G05B 2219/23121; G05B 2219/23142; G05B 2219/23159; G05B 2219/23162; G05B 2219/23168; G05B 2219/23377; G05B 2219/23427; G05B 2219/2643; F22B 1/287; F22B 27/16; F22B 3/00; H05B 2206/022; H05B 3/748; H05B 6/1209; H05B 6/1272; H05B 6/1281; H05B 6/129; H05B 6/6479
USPC .... 126/20, 369; 99/330, 476, 342, 516, 467, 99/468; 219/401, 385, 506; 239/461, 239/498, 504, 509; 392/394; 426/231
See application file for complete search history.

(56) References Cited

U.S. PATENT DOCUMENTS

2001/0032549 A1* 10/2001 Fukushima .............. A21B 3/04
99/476
2005/0109215 A1* 5/2005 Helm .................... F24C 15/327
99/476
2008/0078371 A1 4/2008 Boscaino
(Continued)

FOREIGN PATENT DOCUMENTS

DE 19858134 A1 6/2000

OTHER PUBLICATIONS

CN 204316768 U (Year: 2015).*

*Primary Examiner* — Vy T Nguyen
(74) *Attorney, Agent, or Firm* — LOZA & LOZA, LLP; David S. Sarisky

(57) ABSTRACT

A cooking appliance, in particular a commercial cooking appliance, comprising a cooking chamber; a motor-driven fan wheel which is arranged in an area which is separated from the cooking chamber by a suction plate having a central suction opening; a heating device which has one, at least two heating coils and is arranged around the fan wheel; an appliance control, the appliance control activating the heating coils independently of one another.

5 Claims, 2 Drawing Sheets

(56) References Cited

U.S. PATENT DOCUMENTS

| | | | |
|---|---|---|---|
| 2011/0276184 A1* | 11/2011 | McKee | H05B 6/6485 |
| | | | 219/681 |
| 2016/0077678 A1* | 3/2016 | Reese | G05B 19/106 |
| | | | 99/342 |
| 2022/0120446 A1* | 4/2022 | Pelliccia | B08B 9/093 |

* cited by examiner

COOKING APPLIANCE, IN PARTICULAR COMMERCIAL COOKING APPLIANCE

BACKGROUND

1. Field of the Disclosure

The disclosure relates to a cooking appliance, in particular in the form of a commercial cooking appliance.

2. Discussion of the Background Art

The generic cooking appliance includes a cooking space in which a motor-driven fan wheel is arranged, which is arranged between an adjacent cooking space wall and a suction plate having a suction opening and is thus separated from the cooking space.

Furthermore, a heating device is provided with two or more heating coils which are arranged around the fan wheel.

For steam generation, the generic cooking appliance further includes a water supply line which opens into the suction opening.

Finally, an appliance control is provided for all functions of the cooking appliance to be performed.

However, to operate the heating coils of the heating device, the appliance control only takes into account the cooking space temperature, which on one hand reduces the efficiency of the steam generation and on the other hand leads to strong smoke development in some operating modes.

It is therefore the object of the present disclosure to create a cooking appliance, in particular a commercial cooking appliance, according to the preamble of claim 1, which enables to increase the efficiency of steam generation and at least minimize undesired smoke development.

Investigations and tests carried out within the scope of the disclosure have shown that the fan wheel of cooking appliances, in particular combi-steamers, can be regarded as a centrifugal filter. Accordingly, heavy particles tend to approach a cooking space wall, which is arranged adjacent to the fan wheel, while the air itself flows close to the suction plate. However, depending on the design, this can also be exactly reversed.

SUMMARY

Accordingly, it is provided according to the disclosure that the appliance control activates the heating coils of the heating device independently of one another, in order to activate the heating coil or heating coils for the case of steam generation, which is/are arranged close to the cooking space wall adjacent to the fan wheel, while for cooking modes that particularly cook with hot air, the heating coil is activated, which is arranged close to the cooking space or the suction plate. However, as explained above, depending on the design of the cooking appliance, this can also be exactly reversed, which means that the appliance control activates the heating coils of the heating device again independently of one another in order to activate the heating coils in this alternative for the case of steam generation, which are arranged close to the cooking space or the suction plate, while for cooking space modes, that particularly cook with hot air, the heating coil or the heating coils are to be activated, which is/are arranged close to the cooking space wall adjacent to the fan wheel.

BRIEF DESCRIPTION OF THE DRAWINGS

Further details, features and advantages of the disclosure will be apparent from the following description of the figures of the drawing. Therein shows.

DETAILED DESCRIPTION OF THE PREFERRED EMBODIMENT

Figure 1:
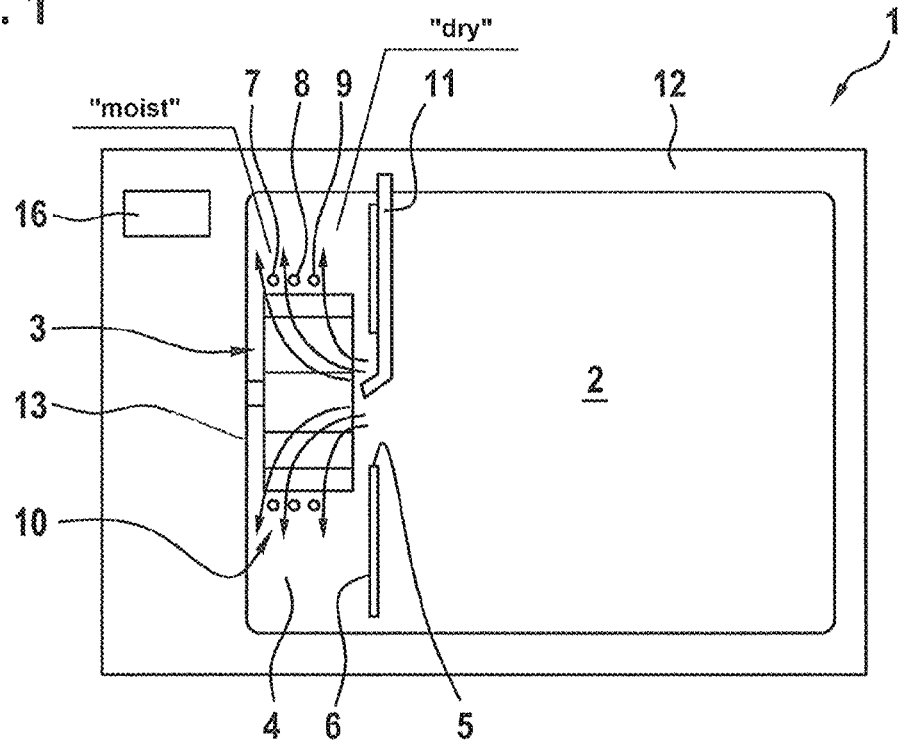
FIG. 1 a schematically greatly simplified principle illustration of a cooking appliance according to the disclosure in an operating mode for steam generation, FIG. 2 an illustration of the cooking appliance according to the disclosure corresponding to FIG. 1 in the operating mode for cooking with hot air, FIG. 3 a block diagram for explanation the influencing parameters which take into account an appliance control of the cooking appliance according to the disclosure, FIG. 4 a schematically greatly simplified partial illustration of the cooking appliance according to the disclosure for explanation a second embodiment, and FIG. 5 an illustration corresponding to FIG. 4 of the cooking appliance according to the disclosure for explanation a third embodiment.
Figure 2:
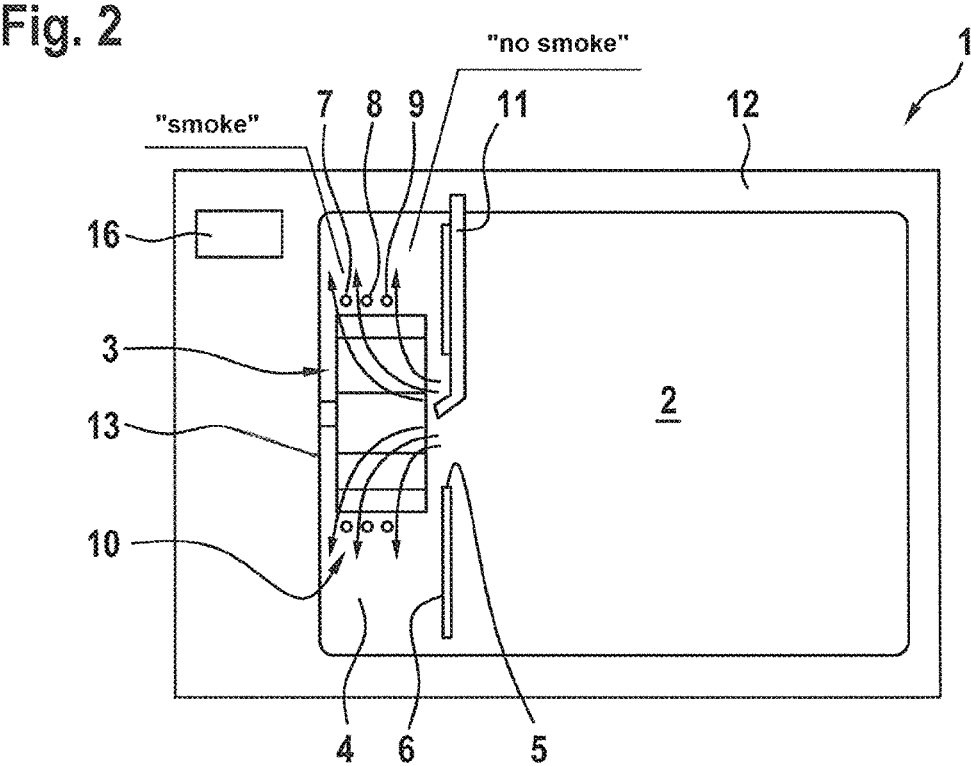

FIGS. 1 and 2 show a cooking appliance 1 according to the present disclosure, which may in particular be designed as a commercial cooking appliance.

Before discussing in detail the principles of the present disclosure, it should be emphasized that in the context of the present application, the term "cooking appliance" is understood to include both commercial cooking appliances and household cooking appliances and, in general, food treatment appliances capable of performing both cold and hot treatment of food and may include, for example, hot air steamers, combi-steamers and other food treatment appliances.

The cooking appliance 1 according to the disclosure includes a cooking space arranged in a housing 12.

Furthermore, a motor-driven fan wheel 3 is shown, which is arranged in an area 4 which is separated from the cooking space 2 by means of a suction plate 6 having a central suction opening 5. This means that the fan wheel 3 is arranged between an adjacent cooking space wall 13 and the suction plate 6 in the area 4.

Furthermore, the cooking appliance 1 includes a heating device 10, which has at least two, in the illustrated case three, heating coils 7, 8, 9, which are arranged around the fan wheel 3.

Furthermore, an optional water supply line 11 is provided which, in the example shown, is activated for the case of steam generation and which opens into the suction opening 5 of the suction plate 6.

Finally, the cooking appliance 1 includes an appliance control/appliance regulation 16 which activates the heating coils 7, 8, 9 independently of one another.

For this activation, the appliance control 16 can activate the heating coils 7, 8, 9, taking into account a plurality of parameters P1 to P5 that influence a cooking process.

Figure 3:
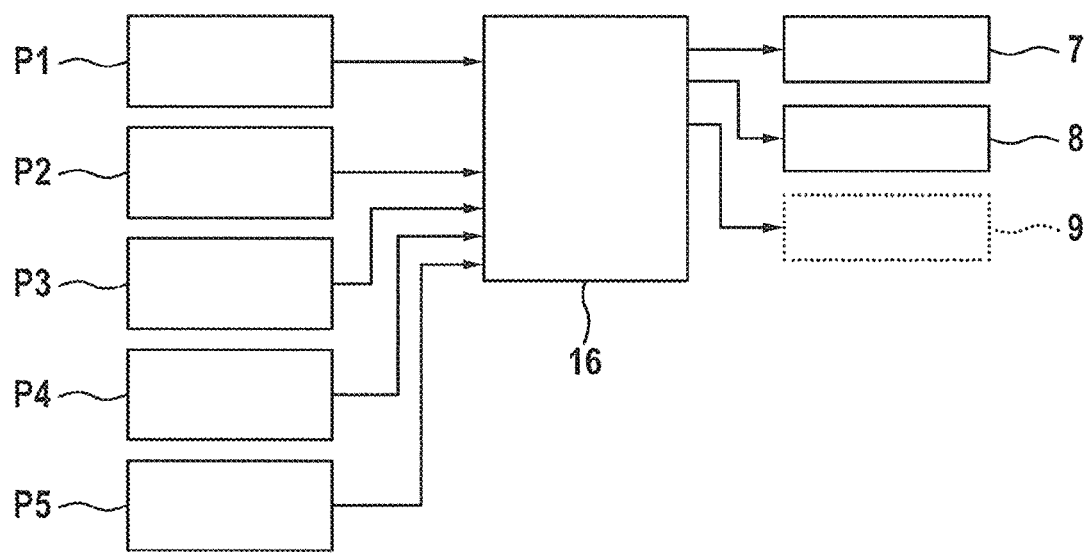

According to FIG. 3, these parameters can include a cooking space temperature prevailing in the cooking space, a set cooking space temperature to be reached, different cooking modes, in particular those which are to be performed without smoke development or at least with minimal smoke development.

Furthermore, the respective selected food to be cooked and other cooking parameters, such as, in particular, the moisture level, the fan wheel speed and other parameters that can be determined via sensors and parameters dependent on actuators, can be taken into account as parameters.

Thereby, FIG. 3 illustrates a setting in which the heating coils 7 and 8 are activated, but the heating coil 9 is not, which is symbolized by the punctured block 9.

According to FIG. 1, the heating coils 7 and 8 are located in a "moist" sub-area of the area 4, since, as explained at the beginning, the centrifugal separation of particles caused by the fan wheel 3 in this "moist" sub-area transports water particles with the air flow, so that the steam generation can be optimized when the heating coils 7 and 8 are actuated.

In the illustration of the cooking appliance 1 according to FIG. 2, the sub-area associated with the heating coils 7 and 8 is the "smoke" sub-area, since in this case the cooking appliance 1 is operated in a convection mode (hot air cooking) in which fat particles are transported to the "smoke" area due to the centrifugal action of the fan wheel 3, whereas in the "no smoke" sub-area of the area 4 in which the heating coil 9 is located, such smoke generation is minimal, if any. For this reason, only the heating coil 9 is activated for this operating mode, while the heating coils 7 and 8 are inoperative.

Figure 4:
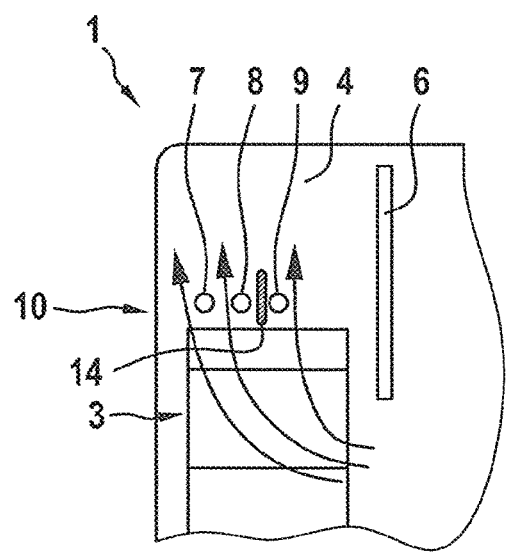

The second embodiment of the cooking appliance 1 according to the partial illustration of FIG. 4 illustrates the provision of an annular separating plate 14, which, in the example, is arranged in or on the heating device 10 between the heating coils 7, 8 on one hand and 9 on the other.

Figure 5:
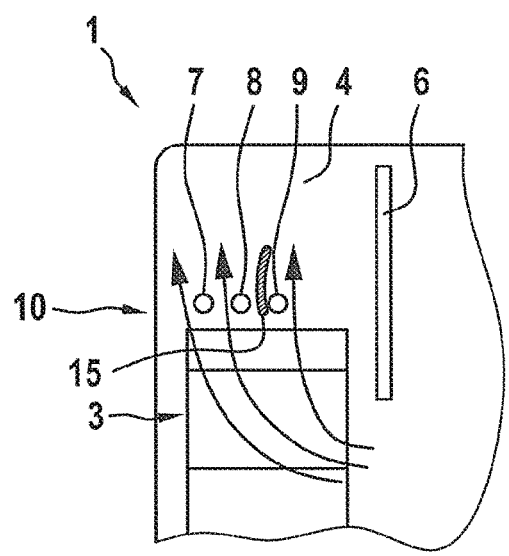

In the embodiment according to FIG. 5, such an annular separating plate 15 is also provided, which, however, is curved.

In principle, it is also possible to provide two such separating plates, wherein one separating plate would be provided between the heating coils 7 and 8 and the other, as shown, between the heating coils 8 and 9.

In addition to the foregoing written disclosure of the disclosure, reference is hereby made to the graphic illustration of the disclosure in FIGS. 1 to 5 to supplement the disclosure.

LIST OF REFERENCE SIGNS 1 cooking appliance, in particular commercial cooking appliance
2 cooking space
3 motor-driven fan wheel
4 area between a cooking space wall 13 and a suction plate 6
5 suction opening
6 suction plate
7, 8, 9 heating coils
10 heating device
22 water supply line
12 housing
13 wall of the cooking space adjacent to the fan wheel 3
14, 15 annular separation walls
16 appliance control/appliance regulation
P1 to P5 parameter

What is claimed is:

1. A cooking appliance comprising:
a cooking space;
a motor-driven fan wheel, which is arranged in an area separated from the cooking space by a suction plate having a central suction opening;
a heating device comprising a plurality of heating coils arranged around the motor-driven fan wheel; and
an appliance control, wherein:
the motor-drive fan wheel functions as a centrifugal filter that causes heavy particles to approach a cooking chamber wall arranged adjacent to the motor-drive fan wheel and air to flow to the suction plate, and
the appliance control is configured to activate the plurality of heating coils independently of one another such that:
for optimized steam generation, at least one of the plurality of heating coils arranged adjacent to the cooking chamber wall is activated and at least one of the plurality of heating coils arranged adjacent to the cooking space is turned off,
for optimized smoke reduction, the at least one of the plurality of heating coils arranged adjacent to the cooking space is activated and the at least one of the plurality of heating coils arranged adjacent to the cooking chamber wall is turned off,
wherein the motor-drive fan wheel is arranged between the cooking chamber wall and the suction plate, wherein a distance from the cooking space to the at least one of the plurality of heating coils arranged adjacent to the cooking space is less than a distance from the cooking space to the at least one of the plurality of heating coils arranged adjacent to the cooking chamber wall.

2. The cooking appliance according to claim 1, wherein the appliance control activates the plurality of heating coils based on a plurality of parameters influencing a cooking process, the plurality of parameters selected from a group consisting of:
a cooking space temperature prevailing in the cooking space,
a set cooking space temperature,
a cooking mode without smoke,
a selected food to be cooked,
a humidity level,
a fan speed, and
other cooking parameters.

3. The cooking appliance according to claim 1, further comprising at least one annular separator plate or separator sub-segments provided between at least two of the plurality of heating coils.

4. The cooking appliance according to claim 3, wherein the at least one annular separator plate is curved.

5. The cooking appliance according to claim 1, further comprising a water supply line which opens into an intake opening.

* * * * *